Feb. 1, 1938.   E. C. BINGHAM ET AL   2,107,230
FLUID CONDUCTOR FOR RULING MACHINES AND THE LIKE
Filed July 30, 1936   3 Sheets-Sheet 2
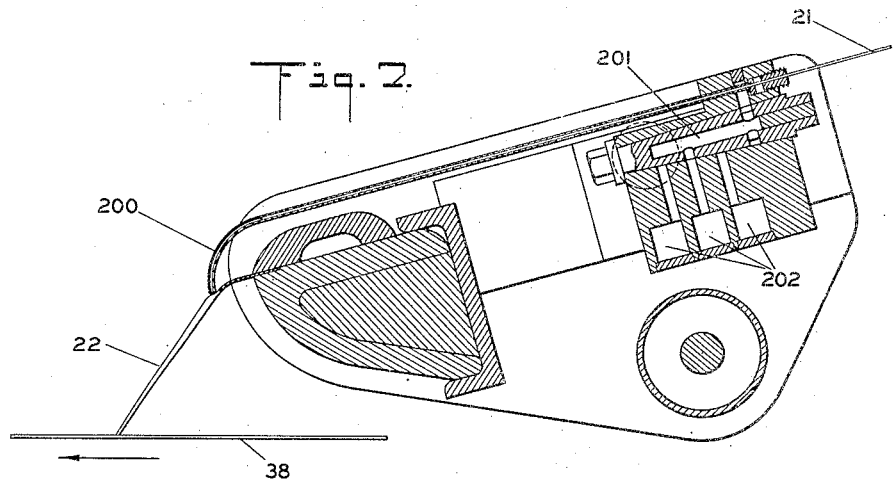
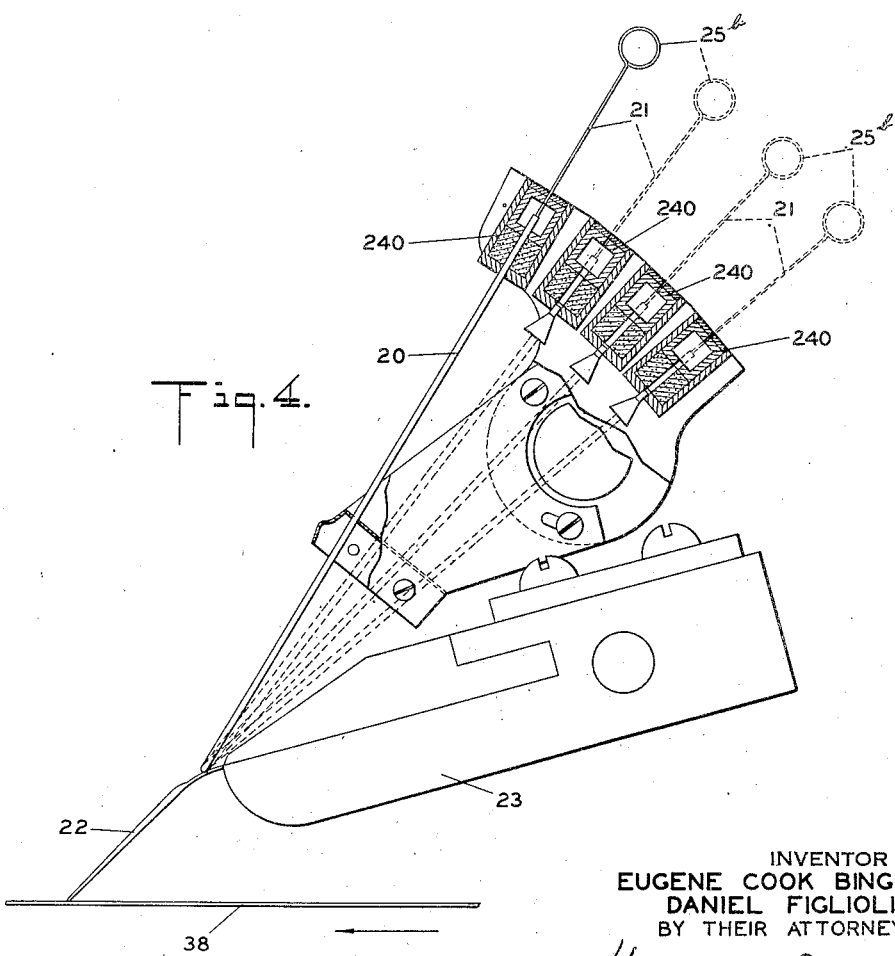
INVENTOR
EUGENE COOK BINGHAM
DANIEL FIGLIOLI
BY THEIR ATTORNEYS

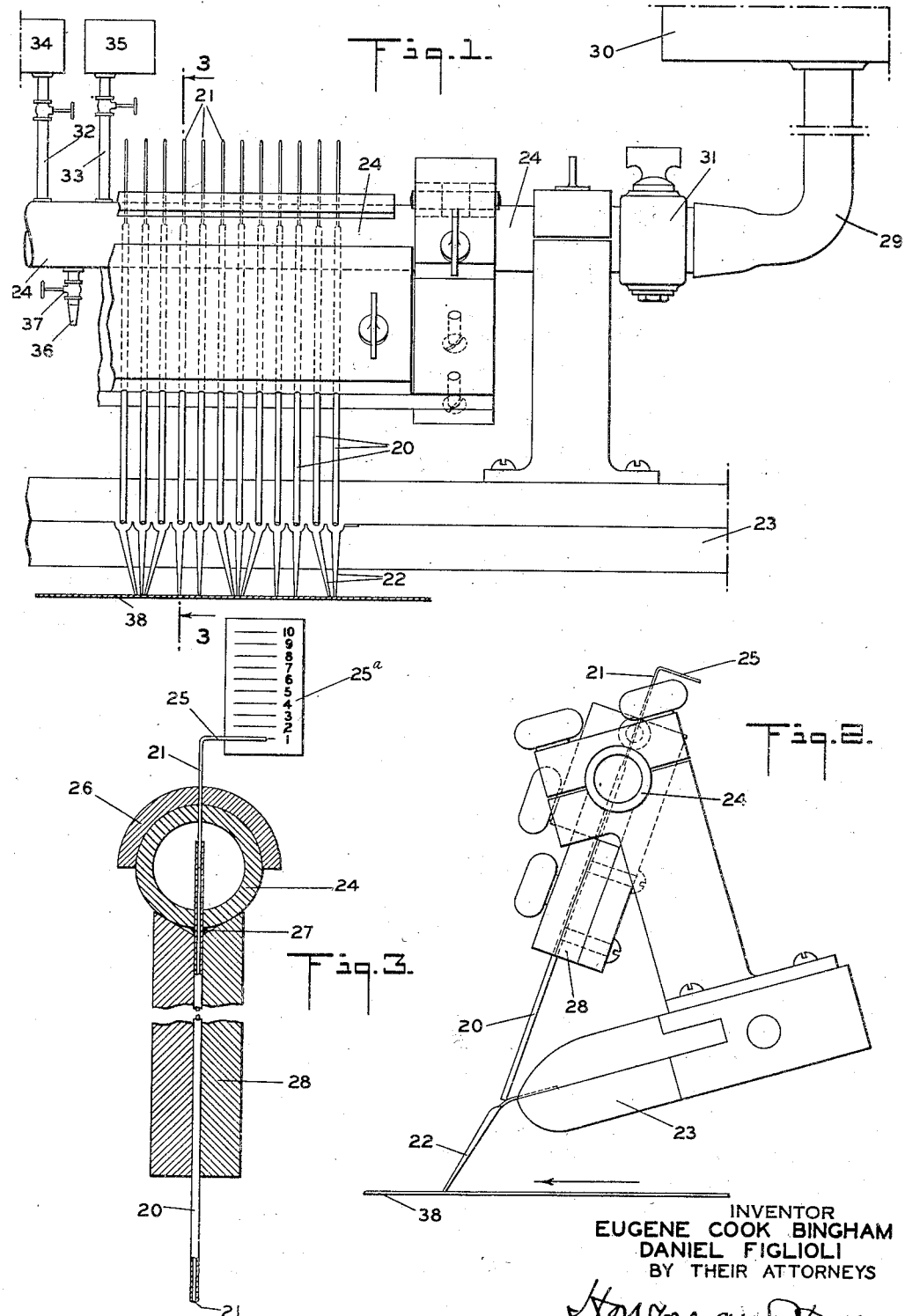

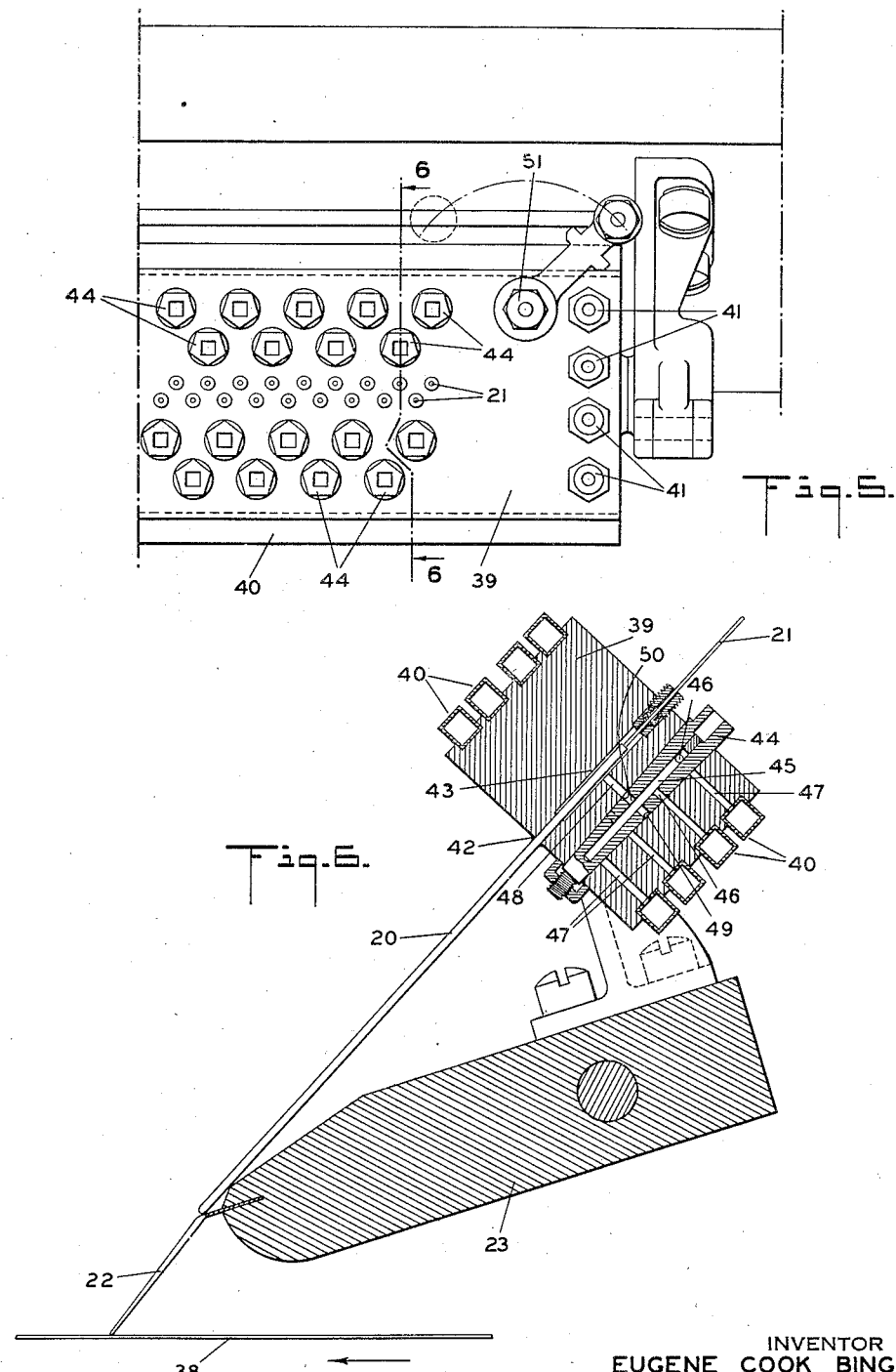

Patented Feb. 1, 1938

2,107,230

UNITED STATES PATENT OFFICE 2,107,230

FLUID CONDUCTOR FOR RULING MACHINES AND THE LIKE

Eugene Cook Bingham, Easton, Pa., and Daniel Figlioli, Brooklyn, N. Y., assignors to Boorum & Pease Company, Brooklyn, N. Y., a corporation of New York Application July 30, 1936, Serial No. 93,492

14 Claims. (Cl. 33—45)

In the accompanying drawings the invention is illustrated in means for regulating the flow of ink to a ruling point in a machine of the type customarily used to rule simultaneously a plurality of parallel lines on writing paper, or the like.

The invention is equally applicable not only to any sort of ruling device where a fluid ruling medium is used, but also it is applicable broadly to devices for any purpose, where it is desired to accurately control the rate of flow of a fluid; or to equalize the amount of fluid from a common source to a plurality of outlets; or to provide means for measuring flow, especially viscous flow.

There has long been a demand for stationery ruled with waterproof ink, but it has not been practical to use waterproof ink in connection with the known ruling machines. Where lines of waterproof ink have been insisted upon by consumers, it has been necessary to print the lines instead of ruling them.

In the usual ruling machine the means of leading the ink to the ruling pen has consisted of a wick of woolen material placed in the ink, and a woolen yarn leading from a wick to each ruling pen. Attempts to use waterproof ink with such a device proved impractical, because the waterproof ink soon clogged the yarns to such an extent that they ceased to function.

Another objection to the yarn fed machine was the high cost of daily care and cleaning.

Objects of the invention are:

To make it possible to use waterproof ink in a ruling machine; to aid in increasing the speed of operation of ruling machines; to provide an easily cleanable ink conduit to the ruling points; to regulate the rate of flow from ink reservoir to ruling points; to insure a constant supply of ink to each of a battery of ruling pens.

Other objects will be apparent from the specification and claims.

In the accompanying drawings:

Figure 1 is a broken front elevation of an inking device embodying the invention for use in a ruling machine;

Figure 2 is an end view of Fig. 1;

Figure 3 is a sectional view on the line 3—3 in Fig. 1;

Figure 4 is an end view, similar to Fig. 2, partly in section of a modification;

Figure 5 is a partial top-rear view of an inking device embodying another modified form of the invention;

Figure 6 is a section on line 6—6 of Fig. 5;

Figure 7 is a view partly in section, similar to Fig. 6, but shows further modifications.

As illustrated in the drawings, a number of pens or points 22 into each of which a novel tube 20 has its outlet, are carried by a beam 23 in known manner. The beam also supports a manifold 24, which conducts ink or other fluid to the tubes 20.

In our improved device, the novel tube 20 containing a body or plunger rod 21 is employed instead of the usual yarn to convey ink to each ruling pen or point 22.

Each tube 20 acts not only as a conduit to conduct the ink to the ruling point, but also, in co-operation with its body 21, as a regulating device by which the rate and volume of flow to the ruling point may be measured, regulated and controlled.

The body 21 fits the tube 20 somewhat closely, but the fit is loose enough to allow the body to be moved up and down, that is to say axially in the tube. The fit is loose enough to permit viscous or linear flow of fluids but is preferably too close to allow hydraulic flow between the body 21 and wall of tube 20. For example, with a capillary tube having an internal diameter of .032 inch one may use as the body 21, a music wire having a diameter of .028 inch. These figures are given only by way of example, and not to limit the scope of the invention in any way. The proper relationship between the cross section of the inside of a tube 20 of any desired size, and the cross section of the outside of a rod 21, to limit the flow of a given fluid to linear flow, can be worked out mathematically. An application of Poiseuille's law of flow can thus be made to advantage.

As illustrated in Figs. 1 to 3 the tube 20 and plunger 21 are of similar, circular cross section, and each is of uniform diameter throughout. These characteristics, however, are optional and may be dispensed with.

As illustrated in Figs. 1 to 3, inclusive, each tube 20 is positioned with its upper end in the manifold 24, and protrudes from the bottom of the manifold. The plunger 21 extends through the top of the manifold so that it may be manually moved up or down in the tube 20. The top of the plunger 21 may be provided with an extension 25 (Fig. 3) which may serve either as a handle for the operator to grasp in adjusting the plunger in the tube, or as an indicating finger in connection with suitable calibration 25a, to aid in regulating or adjusting the device or to measure the flow. If desired a packing 26 may be employed over the top of the manifold 24, to insure a tight fit about the plungers 21, and to prevent the leakage of fluid from the manifold.

The tube 20 may be secured in desired position in the manifold by any suitable means such as a drop of solder 27 as shown in Fig. 3. The tubes 20 may be braced against undue vibration by any suitable means, such as a block 28.

Any suitable means such as a pipe 29 may be provided to conduct ink from an ink tank or reservoir 30. A valve 31 may be provided to turn on or off the flow of ink from the reservoir to the tubes 20. If desired additional pipes 32 and 33 may also be provided to lead fluids to the manifold 24 and tubes 20 from other sources of supply such as reservoirs 34 and 35 respectively. These additional reservoirs and their pipes may be used as additional sources of a ruling fluid, or as sources of cleaning fluids, such as water, air or the like. A vent 36 with a suitable valve 37 may also be provided, preferably on the lower part of the manifold, to allow fluid to be drained therefrom.

The invention has infinite possibilities of variation. For example a machine constructed according to the invention can be arranged so that all the pens 22 will rule with the same color ink, or so that some pens will use one color while others use different colors. Fig. 4 illustrates one such arrangement, in which a series of manifolds 240 is employed. A vertical plane through the device, shows that each pen 22 may be provided with a tube 20 from any manifold 240.

One way of using this modified device is to fill each manifold with ink of a different color, choose certain pens 22 to receive each color, and cut off from each pen the supply of ink from the manifolds carrying the other colors which are not to be used by that pen. This may be accomplished by plugging each tube 20 which is not to be used or employing removable tubes 20 and removing from their manifolds such tubes 20 as are not being used, and plugging the hole left in the manifold in any convenient manner. Other ways of using the device will occur to those skilled in the art.

Figures 5 and 6 show another embodiment of the invention, in which a block 39 carries the tubes 20, rods 21 and U-shaped manifolds 40. As illustrated in these figures there are four manifolds 40, so that as many as four different colors of ink may be used if desired. An inlet 41 is provided for each manifold, whereby it may be connected to an ink well or reservoir similar to 30 in Fig. 1. In this embodiment, the head of the tube 20 does not enter the manifold. Instead the block 39, into which tube 20 is secured at 42 by solder or other suitable means, has an enlarged bore 43 within which ink from one of the manifolds 40 may enter the tube 20. In this embodiment, as in Figs. 1 to 3, inclusive, a single tube 20 leads to each pen point 22. Each tube 20 is provided with a selector valve 44 by the rotation of which the operator may select any one of the four manifolds to deliver ink to a given pen. Valve 44 contains an axial conduit 45, closed at each end. It also contains radial passages 46, spaced from each other along its axis, each connecting with a passage 47 leading through block 39 from a manifold 40 to the seat of valve 44. Each radial passage 46 should be at an appreciable angle to all the other radial passages 46, so that at any revolution of valve 44 not more than one manifold 40 will be connected by its passage 47 and radial passage 46 with the axial conduit 45. A passage 48 in block 39 spaced axially of the valve 44 from radial passages 46 and 47 leads from chamber 43 to the seat of valve 44, and is axially aligned with a circumferential groove or channel 49 in valve 44. Radial conduit 50 leads from axial conduit 45 to circumferential groove 49. Thus the ink from any one manifold 40 may be selected for a given pen 22 and its tube 20, by revolving the selector valve 44 until an axial passage 46 is connected with the passage 47 leading to the desired manifold. Passages 47 and 46 lead from the manifold into the axial conduit 45, thence through radial conduit 50, circumferential groove 49 and conduit 48 into chamber 43, and thence into the tube 20 and to the pen 22.

By staggering tubes 20, and their corresponding selector valves 44, pens 22 may be placed very close together.

In order to turn on or cut off the flow of ink to all the manifolds 40 from their respective reservoirs, a master valve 51 may be provided.

Fig. 7 shows a modification in which the end of tube 200 is bent to aid in directing the ink into the pen point 22. A selector valve 201, similar to valve 44 in Figs. 5 and 6, permits the flow of ink from one of three manifolds 202 to the tube 200.

In the operation of the device the material to be ruled, such as paper, is moved in known manner past the ruling pens 22 on a canvas apron 38 in the direction of the arrow (see Fig. 3). Any suitable fluid, which for convenience we shall call ink, is led from a reservoir or ink well such as 30 into the manifold 24. When the ink in the manifold 24 (Fig. 1) or its accessory chamber 43 (Fig. 6) reaches a level which is above the tops of the tubes 20, the ink will flow down through the tubes 20 and thence into the pens 22 from which it will mark the paper which is being carried past the pens on the moving apron 38. Any number of pens may be used to correspond to the number of lines desired. If more than one pen is used the pens may be spaced in any preferred relation to each other, in known manner. The amount of ink delivered to each tube from the manifold is controlled and regulated by the position of the body 21 within the tube 20. The plunger 21 should be raised or lowered in the tube, until the desired amount of ink flows through each tube.

It has been found that in a ruling machine in which the canvas apron moves at the rate which has heretofore been customary, the tubes work satisfactorily in delivering a constant supply of ink to the pens or points 22, when the rod 21 is inserted into the tube 20 to such an extent that each tube will deliver one drop every 15 to 25 seconds.

In practice, the rate of delivery by the several tubes to their respective pens need not be identical.

Assuming that pressure, temperature and character of fluid used are for practical purposes constant, the maximum amount of ink which tube 20 is capable of delivering, will be delivered to the pen 22 when the rod 21 is completely removed from the tube 20.

The rate of flow per second will be decreased by inserting the rod 21 into the tube a little way, and will be decreased more and more as the rod is pushed further into the tube—that is to say, as the length of rod within the tube is increased. The rate of flow for the tube will be at its minimum when the rod 21 occupies the entire effective length of the tube as illustrated for example in Figs. 3 and 7.

In preferred practice, the flow is not cut off entirely by inserting the rod 21 into the full length of the tube 21.

In use each tube 20 and its rod 21 may be adjusted separately, so that some may have greater rates of flow than others or they may be adjusted to give the same rate of flow. Ordinarily in ruling sheets of paper it is desirable to adjust each tube so that the rate of flow will be practically the same for all of the tubes.

In cases where different colors or different compositions of ink are used in different tubes, inks which have different viscosities may be made to flow at practically the same rates by different adjustments of individual tubes.

Other modifications of structure within the scope of the invention will occur to those skilled in the art. The apparatus shown is only illustrative, and the invention can be carried out by other means.

What we claim is:

1. In a ruling machine or the like having a source of ink and ruling pen, means for conducting ink to said pen comprising a tube and a closely fitting body movable axially in said tube.

2. In a device having a source of fluid, means for delivering said fluid at a pluraltiy of outlets at a predetermined rate of flow comprising a manifold in combination with a regulating device comprising a tube and a closely fitting body movable axially in said tube.

3. In a device having a source of fluid, means for delivering said fluid at a plurality of outlets at a predetermined rate of flow comprising a manifold in combination with a regulating device, comprising a tube and a body movable axially in said tube, the area of the cross section of said body having such relation to the bore of said tube as to allow linear flow between said body and tube.

4. In a device having a source of fluid, means for delivering said fluid at a plurality of outlets at a predetermined rate of flow comprising a manifold in combination with a regulating device, comprising a tube and a body movable axially in said tube, the area of the cross section of said body having such relation to the bore of said tube as to preclude turbulent flow and to allow linear flow between said body and tube.

5. In a ruling machine having a plurality of pen points and a plurality of sources of ink, means for conducting ink from each source to each pen, in combination with means for selecting a single source for connection with each pen, said conducting means including a regulating device comprising a tube and a body movable axially in said tube.

6. In a ruling machine having a plurality of pen points and a plurality of sources of ink, means for conducting ink from each source to each pen, in combination with means for selecting a single source for connection with each pen, said conducting means including a manifold in combination with a regulating device for each pen comprising a tube and a body movable axially in said tube.

7. In a ruling machine having an ink tank and a ruling pen, a manifold intermediate said tank and pen and means for delivering ink from said tank to said manifold, in combination with means for delivering ink from said manifold to said pen comprising a tube and a plunger in said tube.

8. Means for delivering fluid from a common reservoir to a plurality of outlets at a predetermined rate of flow, comprising a manifold, a plurality of tubes connected with said manifold, a plunger in each tube movable axially of said tube, and having a cross section similar to the cross section of the inside of said tube, the relative dimensions of said cross sections being such as to allow viscous flow in the space between said cross sections.

9. In a ruling machine having a plurality of pens a device for feeding ink to said pens comprising a capillary tube leading to each pen, a rod movable lengthwise within said tube, and means for conducting ink to said tubes.

10. In a ruling machine having a plurality of stationary ruling points and a moving apron carrying the material being ruled, a device for feeding ink to said points comprising a tube leading to each point, means for conducting ink into said tubes, and a body within said tube movable lengthwise of the tube, a cross section of the inside of the tube and of the outside of the body bearing such relation to each other that linear flow is allowed between said body and the wall of said tube.

11. In a ruling machine having a plurality of stationary ruling points and a moving apron carrying the material being ruled, a device for feeding ink to said points comprising a tube leading to each point, means for conducting ink into said tubes, and a body within said tube movable lengthwise of the tube, a cross section of the inside of the tube and of the outside of the body bearing such relation to each other that turbulent flow is prevented but linear flow is allowed between said body and the wall of said tube.

12. In a ruling machine or the like, having a source of ink and a plurality of pens, means for regulating the ink supply to each pen comprising a tube and a body movable axially in said tube, in combination with a manifold between said source of ink and said regulating means, means for turning on and off the supply of ink and means for draining said manifold.

13. In a device having a source of fluid, closed means for delivering said fluid at a plurality of outlets at a predetermined rate of flow comprising a manifold in combination with a regulating device comprising a tube and a closely fitting body movable axially in said tube.

14. In a ruling machine or the like having a source of ink and stationary ruling pen, wholly enclosed means including tubes for conducting fluid to said pen and means for regulating the rate of flow of said ink.

EUGENE COOK BINGHAM.
DANIEL FIGLIOLI.